(12) United States Patent
Merlot et al.

(10) Patent No.: US 9,765,637 B2
(45) Date of Patent: Sep. 19, 2017

(54) BLISK WITH LOW STRESSES AT BLADE ROOT, PREFERABLY FOR AN AIRCRAFT TURBINE ENGINE FAN

(71) Applicant: SNECMA, Paris (FR)

(72) Inventors: Damien Merlot, Vaux le Penil (FR); Remi Sers, Paris (FR)

(73) Assignee: SNECMA, Paris (FR)

( * ) Notice: Subject to any disclaimer, the term of this patent is extended or adjusted under 35 U.S.C. 154(b) by 584 days.

(21) Appl. No.: 14/466,044

(22) Filed: Aug. 22, 2014

(65) Prior Publication Data

US 2015/0267545 A1    Sep. 24, 2015

(30) Foreign Application Priority Data

Sep. 9, 2013   (FR) ...................................... 13 58646

(51) Int. Cl.
*F01D 5/30* (2006.01)
*F01D 5/12* (2006.01)
(Continued)

(52) U.S. Cl.
CPC ............ *F01D 5/3069* (2013.01); *F01D 5/021* (2013.01); *F01D 5/12* (2013.01); *F01D 5/3038* (2013.01); *F01D 5/3061* (2013.01); *F01D 5/34* (2013.01); *F01D 11/008* (2013.01); *F01D 5/143* (2013.01); *F05D 2220/323* (2013.01);
(Continued)

(58) Field of Classification Search
CPC .......... F01D 5/12; F01D 5/143; F01D 5/3069; F01D 11/008
See application file for complete search history.

(56) References Cited

U.S. PATENT DOCUMENTS 3,832,092 A * 8/1974 Manharth ............... F01D 5/323
                                                       416/220 R
4,192,633 A * 3/1980 Herzner .................. F01D 5/10
                                                       415/119
(Continued)

FOREIGN PATENT DOCUMENTS

DE   10 2009 023 840 A1   12/2010
EP        0 677 645 A1    10/1995
(Continued)

OTHER PUBLICATIONS

French Preliminary Search Report issued Feb. 13, 2014 in French Application 13 58646, filed on Sep. 9, 2013 ( with English Translation of Categories of Cited Documents).

Primary Examiner — Atif Chaudry
(74) Attorney, Agent, or Firm — Oblon, McClelland, Maier & Neustadt, L.L.P.

(57) ABSTRACT

An assembly for an aircraft turbine engine including an integral element including a disk and a plurality of blades is provided. Each blade has a connection zone connecting the blade to the disk, the connection zone including a first part arranged at the external flowpath delimitation surface provided on the disk, and at least one second end part arranged at a recess formed in the disk along the axial extension of the external surface, the average fillet radius defined by the second end part being larger than the fillet radius defined by the first part. The assembly further includes a flowpath reconstruction part formed in the aerodynamic continuity of the external surface, so as to cover the recess.

11 Claims, 5 Drawing Sheets

(51) Int. Cl.
   *F01D 5/14*    (2006.01)
   *F01D 11/00*   (2006.01)
   *F01D 5/34*    (2006.01)
   *F01D 5/02*    (2006.01)

(52) U.S. Cl.
   CPC ......... *F05D 2240/24* (2013.01); *Y02T 50/671* (2013.01); *Y02T 50/673* (2013.01)

(56) References Cited

U.S. PATENT DOCUMENTS

| | | | | |
|---|---|---|---|---|
| 5,257,909 | A * | 11/1993 | Glynn | F01D 5/3015 416/219 R |
| 6,273,683 | B1 * | 8/2001 | Zagar | F01D 5/22 277/421 |
| 7,625,181 | B2 * | 12/2009 | Matsuda | F01D 5/145 415/191 |
| 9,441,494 | B2 * | 9/2016 | Marlin | F01D 5/323 |
| 2014/0186166 | A1 * | 7/2014 | Kostka | F01D 5/146 415/182.1 |
| 2015/0000304 | A1 * | 1/2015 | Lindsey | F02C 7/04 60/792 |

FOREIGN PATENT DOCUMENTS

| | | | |
|---|---|---|---|
| FR | 2 679 599 | A1 | 1/1993 |
| FR | 2 983 234 | A1 | 5/2013 |

* cited by examiner

BLISK WITH LOW STRESSES AT BLADE ROOT, PREFERABLY FOR AN AIRCRAFT TURBINE ENGINE FAN

TECHNICAL FIELD

This invention relates to the field of aircraft turbine engines and preferably turbojets. More particularly, it relates to the design and manufacture of integral elements including a disk and blades fixed to this disk.

One preferred application applies to blisks for a turbine engine fan.

STATE OF PRIOR ART

Some existing turbojets comprise integral elements each including a disk and blades projecting from this disk. These are preferably rotating elements, for example forming part of the fan, or forming part of the compressor module or the turbine module.

In particular this refers to so-called "blisks", in which each has a complete disk with blades at its periphery.

The blade root may be the location of high stresses, particularly at the leading edges and/or the trailing edges that are usually thinner than the central part of the blades. These high stresses are the result particularly of centrifugal force and aerodynamic forces applied on the blades. These stresses may be a problem when exceptional events occur at the blades such as ingestion of birds or similar obstacles, as is the case particularly for fan blades. Shocks on blades increase the load on highly stressed zones and thus increase the risk of a failure at the blade root, and the risk of propagation through the disk.

Therefore there is a need to optimise the design of these blisks or similar disks, to make it satisfactory both in terms of the risk of a blade failure and aerodynamically.

PRESENTATION OF THE INVENTION

Therefore, the purpose of the invention is to at least partially overcome the disadvantages mentioned above related to embodiments according to prior art.

To achieve this, the first purpose of the invention is an assembly for an aircraft turbine engine comprising an integral element consisting of a disk and a plurality of blades projecting from the disk.

According to the invention, at least one of the two opposite surfaces of at least one of the blades has a connection zone to the disk, said connection zone comprising a first part located at an external flowpath delimitation surface formed on the disk, and at least a second end part located at a recess formed in the disk along the axial extension of said external flowpath delimitation surface, the average fillet radius defined by said second end part being larger than the fillet radius defined by said first part.

Furthermore, the assembly comprises a flowpath reconstruction part formed in the aerodynamic continuity of said external flowpath delimitation surface, so as to cover said recess.

The invention thus provides an ingenious solution satisfying the need for optimisation expressed above. In particular, each second end part has a larger fillet radius to limit the geometric discontinuity between the blade root and the disk. The large fillet radius reduces stresses in the most severely loaded zone(s) and thus limits the risks of blade failure. Furthermore, the increase in this fillet radius is judiciously accompanied by the presence of a disk recess in which this radius may continue, outside the flowpath. Thus, the aerodynamic performances of the proposed solution are also satisfactory, since the recess is covered by the flowpath reconstruction part specific to this invention.

It should be noted that the connection zone described above is preferably retained at each of the two opposite surfaces of the blade, preferably for each blade in the assembly. In this respect, the integral element comprises an entire disk supporting the blades to form a blisk. In other words, the element comprises an entire disk extending around 360° and supporting the blades at its periphery.

The assembly according to the invention is essentially applicable to an aircraft turbine engine fan but alternately it could form part of a compressor or a turbine of the turbine engine, without going outside the scope of the invention.

Preferably, the ratio between the average fillet radius defined by said second end part and the average fillet radius defined by said first part is between 1 and 5.

Preferably, said flowpath reconstruction part has an annular shape and has notches formed at one of its ends through which blades can pass.

Preferably, said reconstruction part is fixed onto the integral element, preferably onto an attachment flange of this element. For example, this attachment may be made simply using bolts or similar elements.

According to a first embodiment, said connection zone comprises a single second end part arranged at a trailing edge or leading edge of the blade.

According to a second embodiment, said connection zone comprises two second end parts arranged on each side of said first part, at a trailing edge and a leading edge of the blade respectively.

In all cases, each second end part of the connection zone extends for example over a length equal to about 25% of the total length of the connection zone, corresponding to the chord length. Nevertheless, this extent may be adjusted as a function of the extent of the highly stressed zone.

Another purpose of the invention is a fan for an aircraft turbine engine comprising at least one assembly like that described above.

Finally, the invention relates to an aircraft turbine engine comprising such a fan.

Other advantages and characteristics of the invention will become clear in the non-limitative detailed description given below.

BRIEF DESCRIPTION OF THE DRAWINGS

This description will be made with reference to the appended drawings among which.

DETAILED PRESENTATION OF PREFERRED EMBODIMENTS

Figure 1:
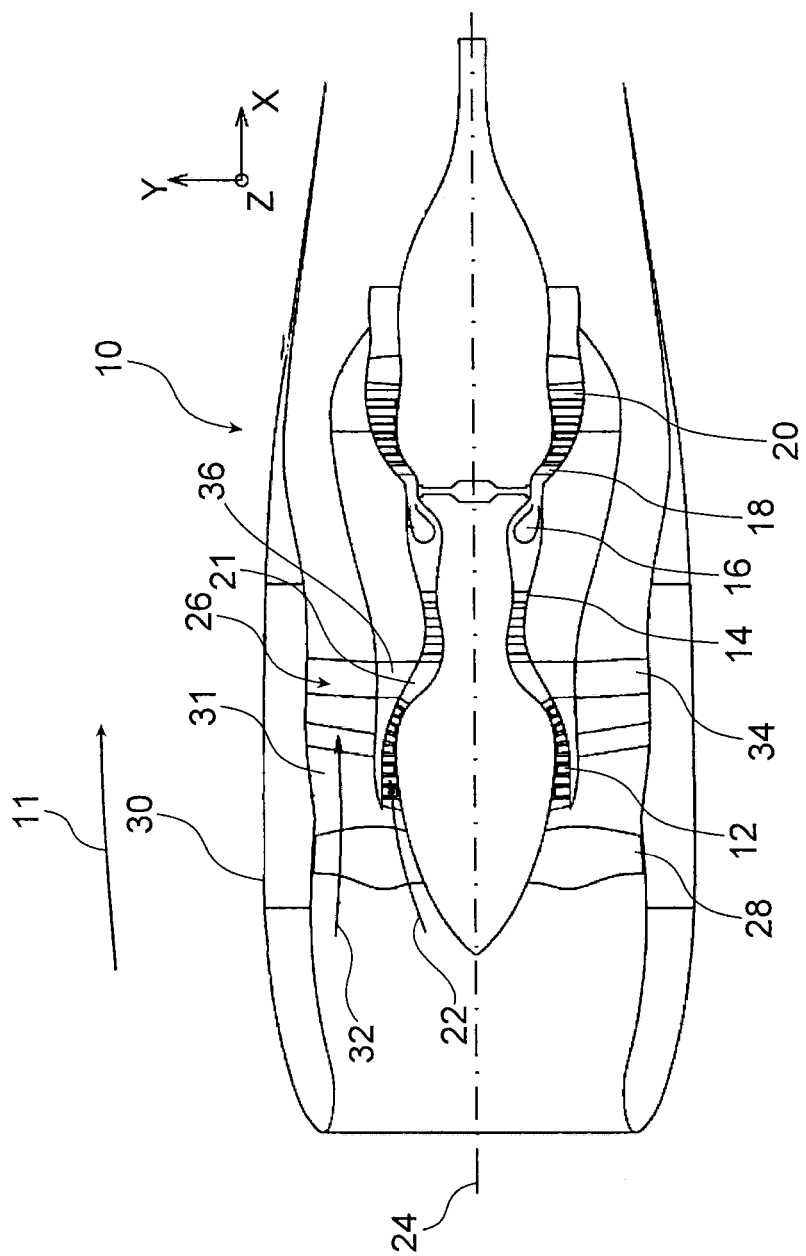
FIG. 1 shows a diagrammatic axial view of a twin-spool turbojet according to the invention.

As shown in FIG. 1 that is a diagrammatic view of an axial section of the invention of a twin-spool turbofan engine 10 that comprises a low pressure compressor 12, a high pressure compressor 14, a combustion chamber 16, a high pressure turbine 18 and a low pressure turbine 20 that define a core engine flowpath 21 through which a primary gas stream 22 passes, in sequence along the upstream-to-downstream direction along the main gas flow direction diagrammatically shown by the arrow 11. The high pressure turbine 18 is fixed to the high pressure compressor 14 so as to form a high pressure spool, while the low pressure turbine 20 is fixed to the low pressure compressor 12 so as to form a low pressure spool such that each turbine drives the associated compressor in rotation about a longitudinal axis of the turbojet 24 under the effect of the thrust of gases from the combustion chamber 16.

There is normally a fan frame 26 between the low pressure compressor 12 and the high pressure compressor 14.

In the case of twin-spool turbojets that comprise a fan 28 around which a nacelle 30 is arranged to generate a fan flow 32 through a fan flowpath 31, the fan frame 26 usually comprises outlet guide vanes 34 passing through this flowpath 31. These vanes 34 are like arms and are also called OGV (Outlet Guide Vane).

Figure 2:
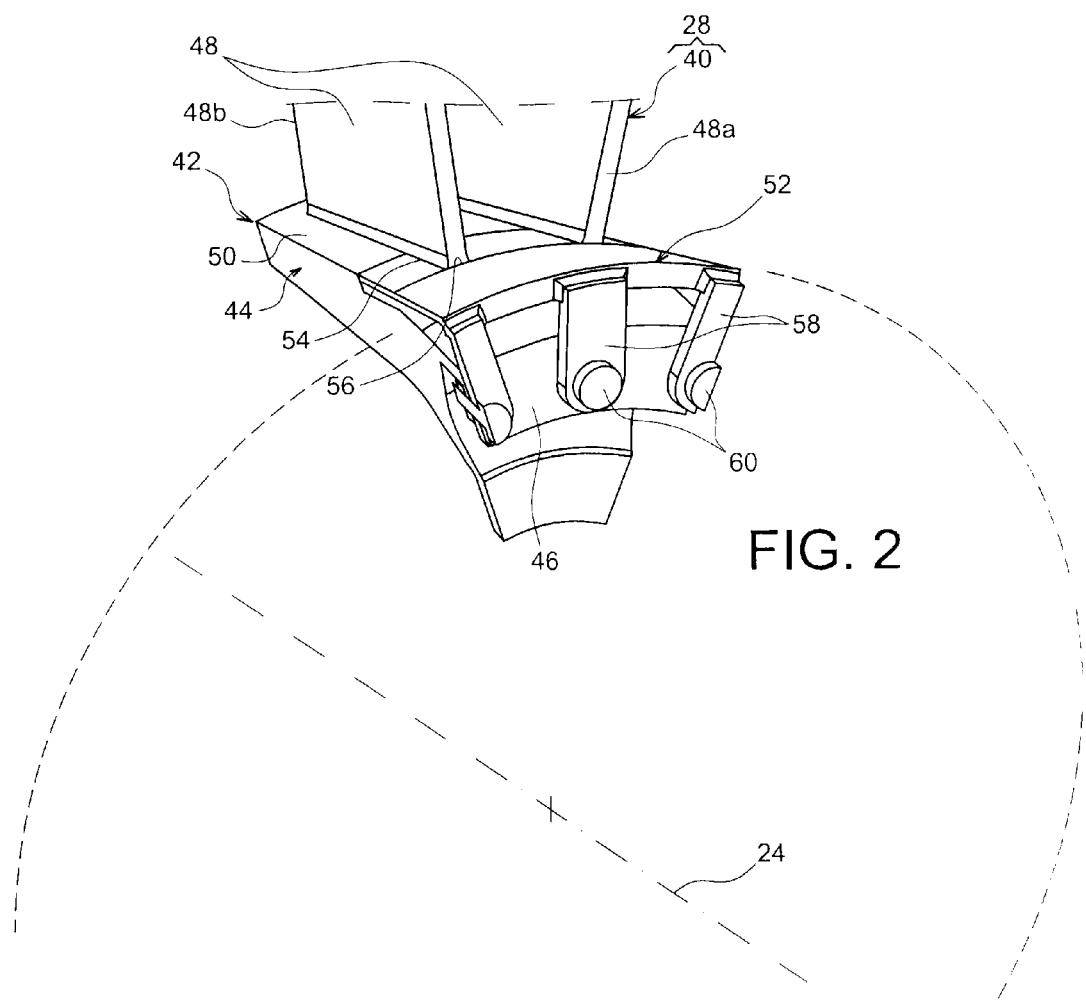
FIG. 2 shows a perspective view of an assembly according to a preferred embodiment of the invention that will form part of the fan of the turbojet shown in FIG. 1.
Figure 3:
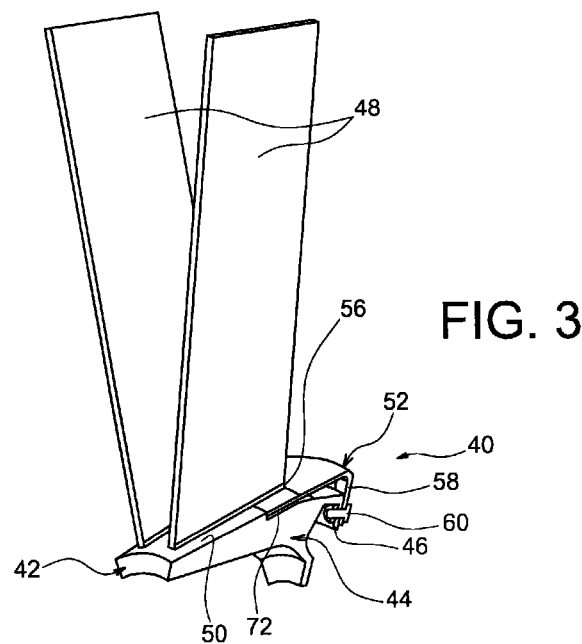
FIG. 3 is also a perspective view of part of the assembly shown in the previous figure, shown from another angle.

The invention is more particularly applicable to the fan 28 that is made essentially from an assembly 40 shown in FIGS. 2 and 3.

In these figures, the assembly 40 is in the form of a preferred embodiment of the invention in which an attempt is made to reduce the highly stressed zone at the leading edge of the blade roots.

The assembly 40 comprises firstly an integral element referenced 42, referred to as a blisk. This element 42 comprises a disk 44 extending around the axis 24, the disk having one or several attachment flanges 46 also integrated into the element 42.

In the blisk, fan blades 48 are arranged all around the disk 44 projecting radially outwards from the periphery of this disk. In this respect, it should be noted that the disk 44 has an external flowpath delimitation surface 50 between the blades 48 that directs the air flowpath passing through the fan. This is an internal delimitation of this flowpath, made in cooperation with an additional part added on to the integral element 42, this part 52 being called the flowpath reconstruction part.

More precisely, the part 52 is annular and is also centred on the axis 24. It has an annular end arranged at the trailing edge 48a of the blades 48, shaped to partially penetrate between the inter-blade spaces. This is done by providing the annular end with notches 54 through which the blade leading edges pass, at the roots of these blades. These notches 54 are thus formed to penetrate through the thickness of the part 52 and are open along the direction from the trailing edge 48a towards the leading edge 48b of the blades. Furthermore, the ends of the trailing edges 48a fit into the bottom 56 of each notch, as can be seen better in FIG. 2.

At the opposite annular end, the flowpath delimitation part 52 is fitted with attachment cleats 58 fixed by bolts 60 onto the downstream attachment flange 46

Therefore, as will be described more fully later, the part 52 contributes to delimiting the flowpath between the blades, in cooperation with the external surface 50 of the disk which therefore does not continue as far as the trailing edge 48a of the blades 48. This delimitation is made using parts of the annular end located between the notches 54, while a main casing of the part 52 delimits said flowpath on the downstream side of the trailing edges 48a.

Now with reference to FIGS. 4 to 7, the figures show one of the special features of this invention. In this case, at each of the intrados and extrados surfaces of each blade 48, the blade has a connection zone 64 at which the root of this blade is connected to the disk 44. The connection zone 64 firstly has a first part 64a that extends from the leading edge 48b until close to the trailing edge 48a, without reaching the trailing edge. This first part 64a of the connection zone makes the transition between the aerodynamic surface of the blade 48 and the external flowpath delimitation surface 50 at which this first part 64a is located.

Figure 6:
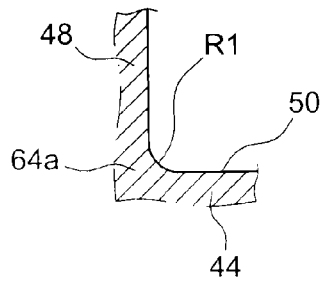
FIG. 6 is a sectional view taken along the line VI-VI in FIG. 5.
Figure 7:
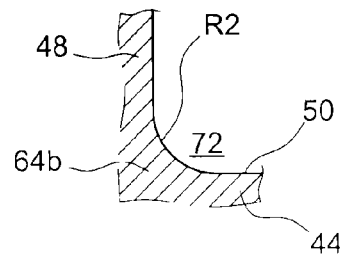
FIG. 7 is a sectional view taken along the line VII-VII in FIG. 5.

As can be seen in FIG. 6, this first part 64a of the connection zone defines an average fillet radius R1 between the aerodynamic surface of the blade and the external flowpath delimitation surface 50.

It should be noted that the fillet radius R1 may be exactly the same all the way along the first part 64a, or it may vary along this part. If it varies, the average radius R1 corresponds to the average of all the fillet radii in this part 64a.

Figure 4:
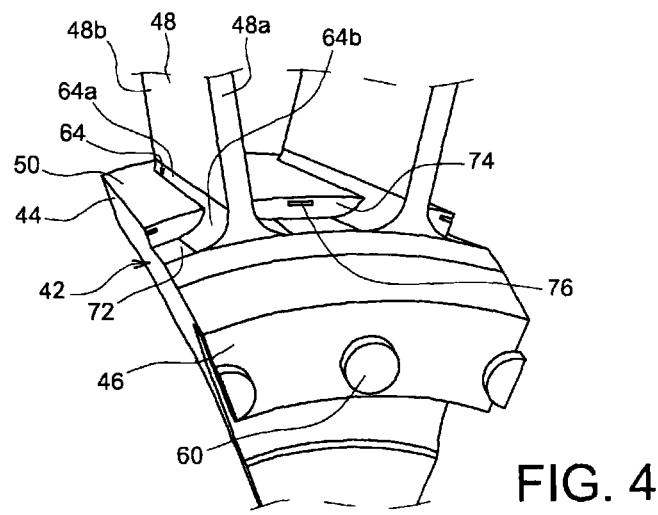
FIG. 4 is a view approximately the same as that in FIG. 2 with the flowpath reconstruction part removed for reasons of clarity.

Furthermore, the connection zone 64 comprises a second end part 64b formed in the axial continuity of the first part 64a. This second part extends as far as the trailing edge 48a of the blade. It is arranged at a recess in the disk 72 located along the axial extension of the external flowpath delimitation surface 50. This recess 72, that can be made with a gradual slope from the surface 50 or with a sudden change as shown in FIG. 4, enables the second end part 64b to make a smoother geometric transition between the aerodynamic surface concerned of the blade 48, and the disk 44. The second end part 64b also extends as far as the bottom of the recess 72, and can thus define an average fillet radius R2 larger than the radius R1. In this case, note also that the fillet radius R2 may be identical all along the second part 64b, or it may vary along this part. If it varies, the average radius R2 corresponds to the average of all fillet radii in this part 64b. It is also preferred that the transition between the first part 64a and the second part 64b should be progressive.

Since there is a recess 72 into which a portion of the second end part 64b fits, this second end part may be very much longer than the first part 64a that is further upstream. It should be noted that the ratio between radii R2 and R1 is preferably between 1 and 5.

By increasing the value of the radius R2 relative to the radius R1, the geometric discontinuity between the blade root and the disk is limited, thus limiting stresses developed in these mechanically loaded zones during operation.

Figure 5:
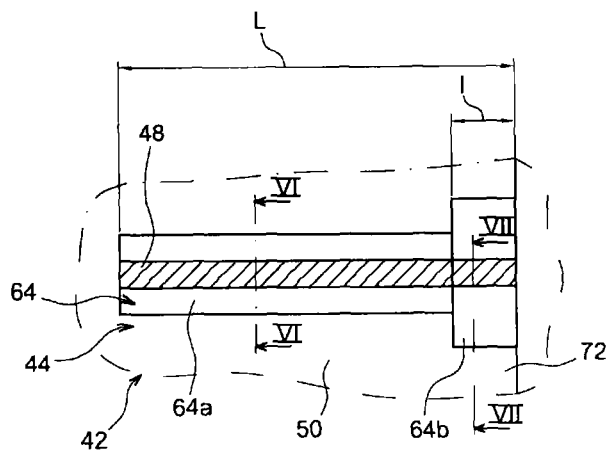
FIG. 5 is a diagrammatic sectional view of part of the assembly shown in FIGS. 2 to 4, in a transverse plane passing through one of the blades in this assembly.

As shown diagrammatically in FIG. 5, the length "l" of the second end part 64b may for example be equal to about 25% of the total length "L" of the connection zone 64, which is equal to the chord length. Nevertheless, the extent of this length "l" may be adjusted depending on the extent of the highly stressed zone. For example, it may be equal to 15 to 35% of the total length "L" of the connection zone 64.

In this preferred embodiment, only the trailing edge 48a of the blades 48 makes use of the principle specific to the invention, to reduce overstress effects. Nevertheless, a similar principle could be used at the leading edge 48b of the blades, without going outside the scope of the invention. In this case, the first part 64a of the connection zone 64 would then be squeezed between two second end parts 64b located at the trailing edge and the leading edge respectively of each blade, with a flowpath reconstruction part 52 located between the upstream end and the downstream end of the disk 44.

As mentioned above, the flowpath reconstruction part 52 is formed in the aerodynamic continuity of the external surface 50, so as to cover the recesses 72 with the parts located between the notches in this part 52. The reconstruction part is preferably an integral part, and is thin and has a high deformation capacity so as to minimise stresses at the trailing edge 48a of the roots of the blades 48. The part 52 may for example be made from a material that is more easily deformed than titanium, for example aluminium or one of its alloys, to limit risk of shear at the blade root under extreme blade bending situations such as a blade loss, ingestion of birds, etc. On the other hand, the blisk 42 is preferably made from titanium or a titanium alloy.

Figure 8:
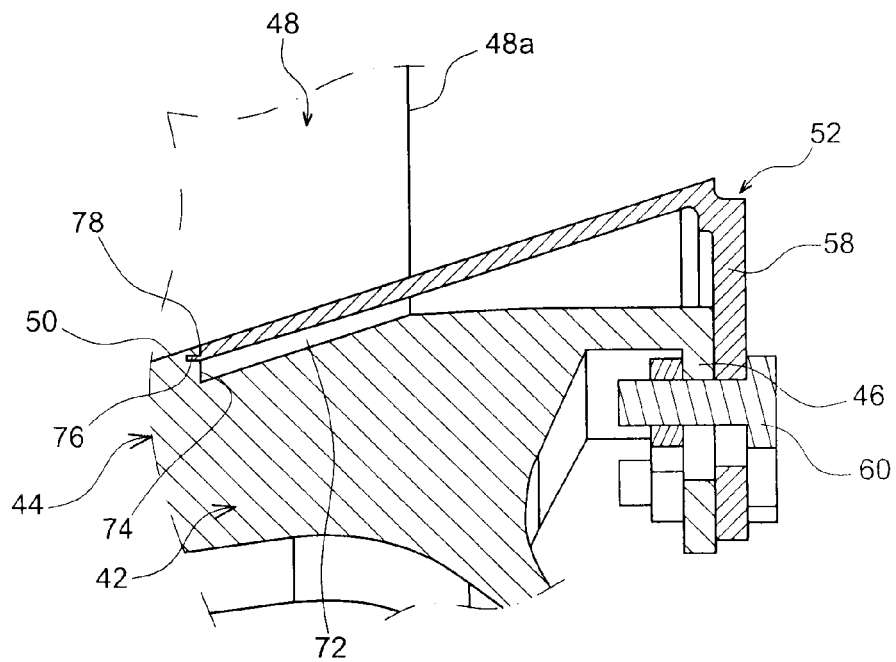
FIG. 8 is a partial sectional view of the assembly shown in FIGS. 2 to 7, in a plane passing through the axis of the assembly disk.

In covering the recesses 72, the part also covers a portion of each second end part 64b extending as far as the bottom of the recess. With reference to FIGS. 4 and 8, the sidewall 74 of the recess 72, oriented along the downstream axial direction, has a notch 76 into which a cleat 78 will be fitted at the end of the flowpath reconstruction part 52.

With this type of fitting that can obviously be inverted by providing cleats 78 in the recesses of the disk 44, the external surface 50 of the disk 44 is held in a good radial position relative to the external surface of the part 52, between which aerodynamic continuity is required for formation of the flowpath. It is also preferable if the part 52 is not in contact with the bottom of the recess 72, keeping a free space between these two elements, to reduce the global mass of the assembly and stresses at blade roots. Furthermore as can be better seen in FIG. 8, it is preferable that the part 52 should be routed without contact with the disk 44, except for mechanical connections planned at the ends, firstly by the assembly of cleats 78 in the slots 76, and secondly by assembly of cleats 58 on the downstream attachment flange 46.

Obviously, those skilled in the art could make various modifications to the invention as described above solely as non-limitative examples.

The invention claimed is:

1. An assembly for an aircraft turbine engine comprising:
an integral element including a disk and a plurality of blades projecting from the disk,
wherein at least at one of two opposite surfaces of at least one of the blades, the blade has a connection zone connecting said blade to the disk, said connection zone comprising a first part arranged at an external flowpath delimitation surface provided on the disk, and at least a second end part arranged at a recess in the disk located along an axial extension of said external flowpath delimitation surface, an average fillet radius defined by said second end part being larger than an average fillet radius defined by said first part, and
wherein the assembly comprises a flowpath reconstruction part formed in an aerodynamic continuity of said external flowpath delimitation surface, so as to cover said recess, a portion of said flow path reconstruction part being arranged around a portion of the two opposite surfaces of the at least one of the blades.

2. The assembly according to claim 1, wherein a ratio between the average fillet radius defined by said second end part and the average fillet radius defined by said first part is between 1 and 5.

3. The assembly according to claim 1, wherein said flowpath reconstruction part has an annular shape, and an end of said flowpath reconstruction part has notches through which blades can pass.

4. The assembly according to claim 1, wherein said flowpath reconstruction part is fixed onto the integral element.

5. The assembly according to claim 4, wherein said flowpath reconstruction part is fixed onto an attachment flange of the integral element.

6. The assembly according to claim 1, wherein said connection zone comprises a single second end part, arranged at a trailing edge or leading edge of the blade.

7. The assembly according to claim 1, wherein said connection zone comprises two second end parts, arranged on each side of said first part, at a trailing edge and a leading edge of the blade respectively.

8. The assembly according to claim 7, wherein each second end part of the connection zone extends over a length equal to 15 to 35% of a total length of the connection zone.

9. The assembly according to claim 1, wherein said integral element is a blisk.

10. A fan for an aircraft turbine engine comprising at least an assembly according to claim 1.

11. An aircraft turbine engine comprising a fan according to claim 10.

* * * * *

UNITED STATES PATENT AND TRADEMARK OFFICE
CERTIFICATE OF CORRECTION

PATENT NO. : 9,765,637 B2  Page 1 of 1
APPLICATION NO. : 14/466044
DATED : September 19, 2017
INVENTOR(S) : Damien Merlot et al.

It is certified that error appears in the above-identified patent and that said Letters Patent is hereby corrected as shown below:

In the Specification

Column 3, Line 67, change "onto the downstream attachment flange 46" to --onto the downstream attachment flange 46.--

Signed and Sealed this
Fifth Day of March, 2019

Andrei Iancu
*Director of the United States Patent and Trademark Office*